US012609652B2

(12) United States Patent (10) Patent No.: US 12,609,652 B2

Yeh et al. (45) Date of Patent: Apr. 21, 2026

(54) PHOTOVOLTAIC-INVERTER HEAT-DISSIPATION ASSEMBLY

(71) Applicant: Delta Electronics, Inc., Taoyuan City (TW)

(72) Inventors: Chia-Hao Yeh, Taoyuan City (TW); Hung-Chuan Lin, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 298 days.

(21) Appl. No.: 18/219,471

(22) Filed: Jul. 7, 2023

(65) Prior Publication Data

US 2024/0388248 A1 Nov. 21, 2024

(30) Foreign Application Priority Data

May 16, 2023 (CN) .......................... 202310549487.8

(51) Int. Cl.
H02S 40/34 (2014.01)
H02S 40/32 (2014.01)
(52) U.S. Cl.
CPC ............ H02S 40/345 (2014.12); H02S 40/32 (2014.12)
(58) Field of Classification Search
CPC ... H02S 40/345; H02S 40/32; H05K 7/20918; H05K 7/20909; H05K 7/209; H02M 7/003; H02M 7/42
See application file for complete search history.

(56) References Cited

U.S. PATENT DOCUMENTS

| | | | |
|---|---|---|---|
| 10,582,648 B2 | 3/2020 | Kurozaki et al. | |
| 2004/0036819 A1 | 2/2004 | Ryu et al. | |
| 2012/0026660 A1* | 2/2012 | Donth ................... | E05B 67/383 |
| | | | 361/679.01 |
| 2020/0187391 A1* | 6/2020 | Zhu .................... | H05K 7/20909 |

(Continued)

FOREIGN PATENT DOCUMENTS

| | | |
|---|---|---|
| CN | 103260386 A | 8/2013 |
| CN | 104049700 A | 9/2014 |
| CN | 212677069 U | 3/2021 |

(Continued)

*Primary Examiner* — Michael Y Sun
(74) *Attorney, Agent, or Firm* — KIRTON McCONKIE; Evan R. Witt

(57) ABSTRACT

A photovoltaic-inverter heat-dissipation assembly is disclosure and includes a front housing-base, a rear cover, a first heat-generating device, a first fan, a second heat-generating device and a second fan. The rear cover and the front housing-base are combined to separately form a first heat-dissipation space and a second heat-dissipation space. The rear cover includes a first air-inlet, a second air-inlet and an air-outlet. The first air-inlet and the second air-inlet are in communication with the air-outlet through the first heat-dissipation space and the second heat-dissipation space, respectively. The first fan generates a first airflow, which enters through the first air-inlet, flows through the first heating-generating device accommodated in the first heat-dissipation space, and flows out through the air-outlet. The second fan generates a second airflow, which enters through the second air-inlet, flows through the second heat-generating device accommodated in the second heat-dissipation space, and flows out through the air-outlet.

15 Claims, 15 Drawing Sheets

(56)                     References Cited

U.S. PATENT DOCUMENTS

| 2020/0367389 | A1 | 11/2020 | Jauhonen et al. |
| 2021/0391824 | A1 | 12/2021 | Zheng et al. |

FOREIGN PATENT DOCUMENTS

| EP | 3668294 | A1 | 6/2020 |
| JP | 5730701 | B2 | 6/2015 |
| TW | M493696 | U | 1/2015 |
| TW | I505073 | B | 10/2015 |

* cited by examiner

PHOTOVOLTAIC-INVERTER HEAT-DISSIPATION ASSEMBLY

CROSS-REFERENCE TO RELATED APPLICATION

This application claims priority to China Patent Application No. 202310549487.8, filed on May 16, 2023. The entire contents of the above-mentioned patent application are incorporated herein by reference for all purposes.

FIELD OF THE INVENTION

The present disclosure relates to a heat-dissipation assembly, and more particularly to a photovoltaic-inverter heat-dissipation assembly having the interior of the assembled housing divided into the first heat-dissipation space and the second heat-dissipation space, and capable of dissipating the heat source through the independent airflow, so as to provide the better heat-dissipation performance and avoid the generation of hot air backflow from affecting the overall heat-dissipation performance.

BACKGROUND OF THE INVENTION

A photovoltaic inverter (or PV inverter for short) is a type of power inverter which converts the variable direct current (DC) output of a photovoltaic solar panel into a utility frequency alternating current (AC). Generally, a PV inverter includes a lot of heat-generating devices accommodated in an assembled housing. Preferably, the power devices (such as IGBTs, MOSFETs, etc.) are accommodated in the front chamber of the assembled housing due to the waterproof and dustproof requirements. The heat generated by the power devices is dissipated through the heat sink accommodated in the rear chamber and thermally coupled to the power devices. In addition to the heat sink corresponding to the power devices, the boost choke, inverter choke, the boost module, other active or passive components for the inverter module are arranged in the rear chamber of the photovoltaic-inverter assembly.

On the other hand, the conventional photovoltaic-inverter heat-dissipation assembly includes a group of forced air-cooling fans disposed on a single bottom side, so as to dissipate the heat form many components in the rear chamber. However, the airflow formed by the fans disposed on the bottom side of the heat-dissipation assembly flows through the rear chamber from bottom to top, so as to flow through the boost inductor, the inverter inductor and the heat sinks corresponding to the boost module and the inverter module. Assuming that the heat exchange of the airflow with a heat source may increase the temperature of the airflow by 10 degrees, when the airflow flows through the four heat sources sequentially from bottom to top, the heat from the bottom heat source will transfer to the top heat source and the heat-dissipation performance of the heat-dissipation assembly will be deteriorated.

Therefore, there is a need of providing a photovoltaic-inverter heat-dissipation assembly having the interior of the assembled housing divided into the first heat-dissipation space and the second heat-dissipation space, and capable of dissipating the heat source through the independent airflow, so as to provide the better heat-dissipation performance, avoid the generation of hot air backflow from affecting the overall heat-dissipation performance, and obviate the drawbacks encountered by the prior arts.

SUMMARY OF THE INVENTION

An object of the present disclosure is to provide a photovoltaic-inverter heat-dissipation assembly. By assembling the front housing-base with the rear cover, the internal space of the rear chamber is divided into at least two heat-dissipation spaces, which are capable of dissipating the heat source through the independent airflow, respectively, so as to provide the better heat-dissipation performance, avoid the generation of hot air backflow from affecting the overall heat-dissipation performance. Each of the at least two heat-dissipation space has an independent fan and an independent air-inlet correspondingly disposed therein, so that at least two independent airflows are formed to effectively dissipate at least two heat-generating devices, respectively. The airflows for heat-dissipating in the at least two heat-dissipation space do not interfere with each other. After completing the heat-dissipation actions, the at least two independent airflows are discharged through at least one air-outlet on the top side, respectively, so as to exert a good heat-dissipation effect effectively.

Another object of the present disclosure is to provide a photovoltaic-inverter heat-dissipation assembly. The space of the rear chamber is divided into at least two heat-dissipation spaces, which are isolated from each other, and include an independent fan and an independent air-inlet, respectively. The openings of the air-inlets of the at least two heat-dissipation spaces face different directions, so that the mutual interference is reduced and the stability of the independent airflow flowing through the corresponding air-inlet is maintained. In addition, the flow directions of the independent airflows at the air-outlets are also different from the flow directions of the independent airflows at the corresponding air-inlets. Cooperating with the retaining wall arranged between at least one air-outlet and each air-inlet, the interference of the airflow is reduced, and the generation of heat-dissipation air backflow is avoided at the same time, so as to achieve the optimization of each independent airflow. On the other hand, since the retaining wall is arranged between at least one air-outlet and the air-inlets, when the photovoltaic-inverter heat-dissipation assembly is fixed to a wall through the retaining wall and maintains a spaced distance, a sufficient space between the back panel and the wall is provided for air flow. Moreover, the retaining wall structure is located between the air-outlet and the air-inlet, and it facilitates to prevent the airflow flowing through the upper air-outlet from flowing back to the lower air-inlet. It allows to arrange the active components such as the boost module, the inverter module, IGBT, MOSFETF semiconductor switching devices or the passive components such as the capacitors, the boost choke, the inverter choke and the resistors of the PV inverter in the at least two heat-dissipation spaces according to the actual heat-dissipation requirements, so as to exert the best heat-dissipation performance. The active components or the passive components with the requirements of waterproof and dustproof are accommodated in the front chamber and thermally coupled to the heat sink in the rear chamber, so as to dissipate the heat through the airflow. The active components or the passive components without the requirements of waterproof and dustproof are accommodated in the rear chamber to dissipate the heat through the airflow. In other words, the at least two heat-dissipation spaces divided from the rear chamber are configured to accommodate different sets of heat sinks or chokes, and the independent airflow in each heat-dissipation space is used to dissipate the heat, so that the occurrence of hot air dissipation or hot air backflow is avoided, and the overall efficiency of heat-dissipation effectively is improved effectively.

In accordance with an aspect of the present disclosure, a photovoltaic-inverter heat-dissipation assembly is provided and includes a front housing-base, a rear cover, a first heat-generating device, a first fan, a second heat-generating device and a second fan. The front housing-base includes a rear mounting surface and a partition element, wherein the partition element is disposed on the rear mounting surface. The rear cover is combined with the partition element and the rear mounting surface of the front housing-base to form a first heat-dissipation space and a second heat-dissipation space separated from each other, and includes a first air-inlet, a second air-inlet and at least one air-outlet, wherein the first air-inlet and the second air-inlet are in communication with the at least one air-outlet through the first heat-dissipation space and the second heat-dissipation space, respectively. The first heat-generating device is disposed on the rear mounting surface and accommodated in the first heat-dissipation space. The first fan is disposed adjacent to the first air-inlet, located between the first air-inlet and the first heat-generating device, and configured to generate a first airflow, which enters through the first air-inlet, flows through the first heating-generating device, and flows out through the at least one air-outlet. The second heat-generating device is disposed on the rear mounting surface and accommodated in the second heat-dissipation space. The second fan is disposed adjacent to the second air-inlet, located between the second air-inlet and the second heat-generating device, and configured to generate a second airflow, which enters through the second air-inlet, flows through the second heat-generating device, and flows out through the at least one air-outlet.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
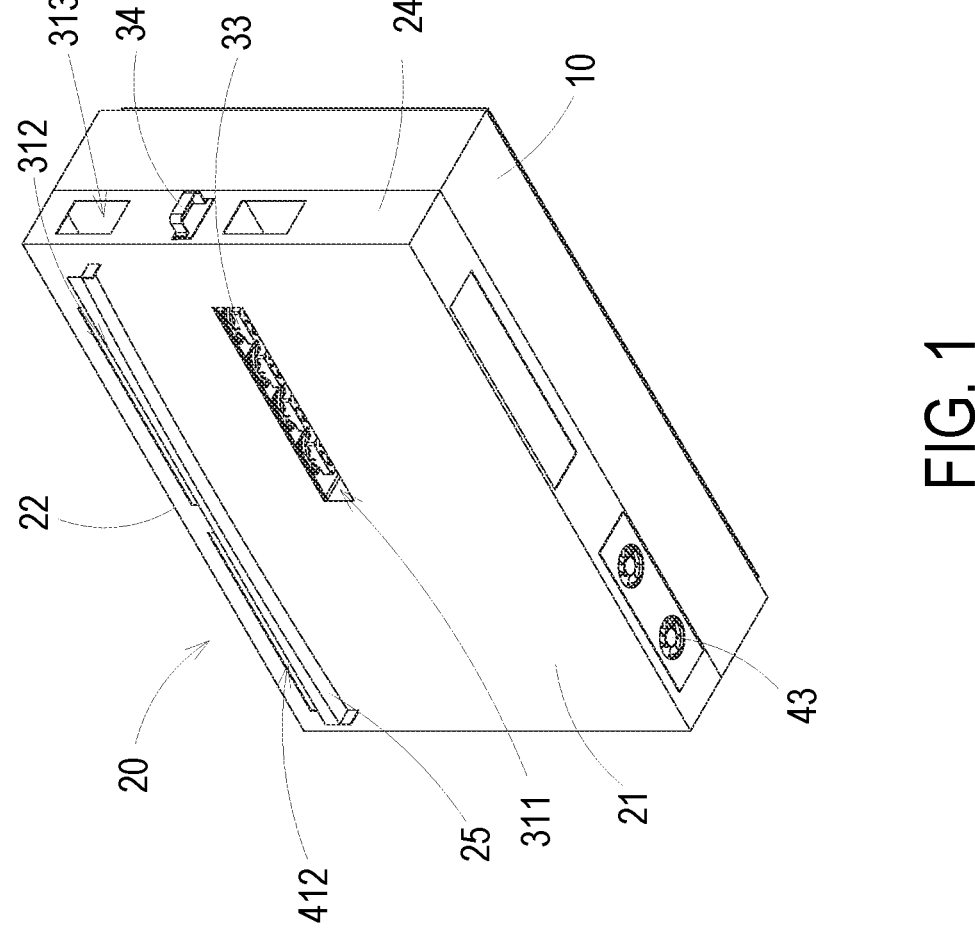
FIG. 1 is a perspective structural view illustrating a photovoltaic-inverter heat-dissipation assembly according to a first embodiment of the present disclosure.
Figure 2A:
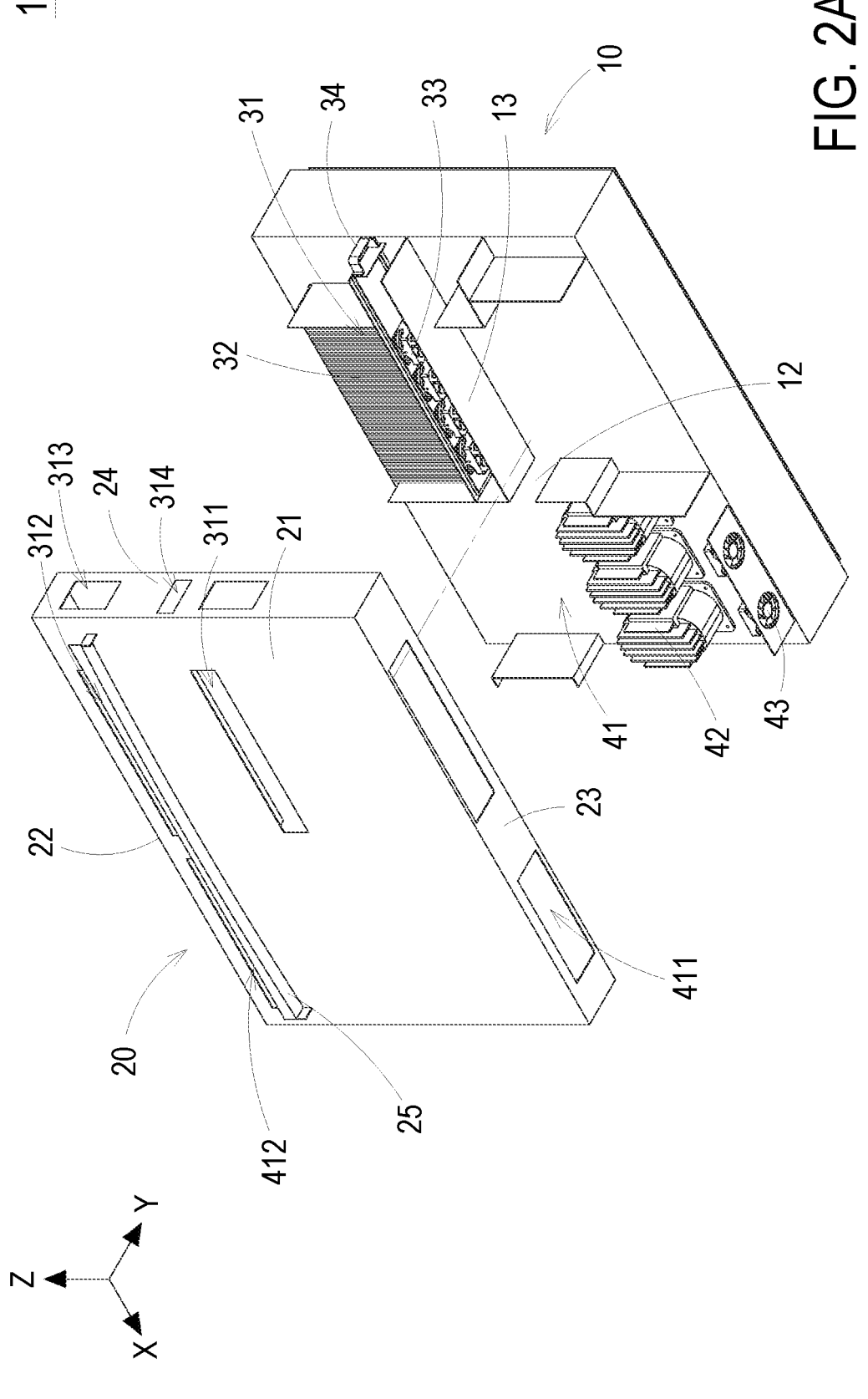
FIGS. 2A and 2B are exploded views illustrating the photovoltaic-inverter heat-dissipation assembly according to the first embodiment of the present disclosure.
Figure 2B:
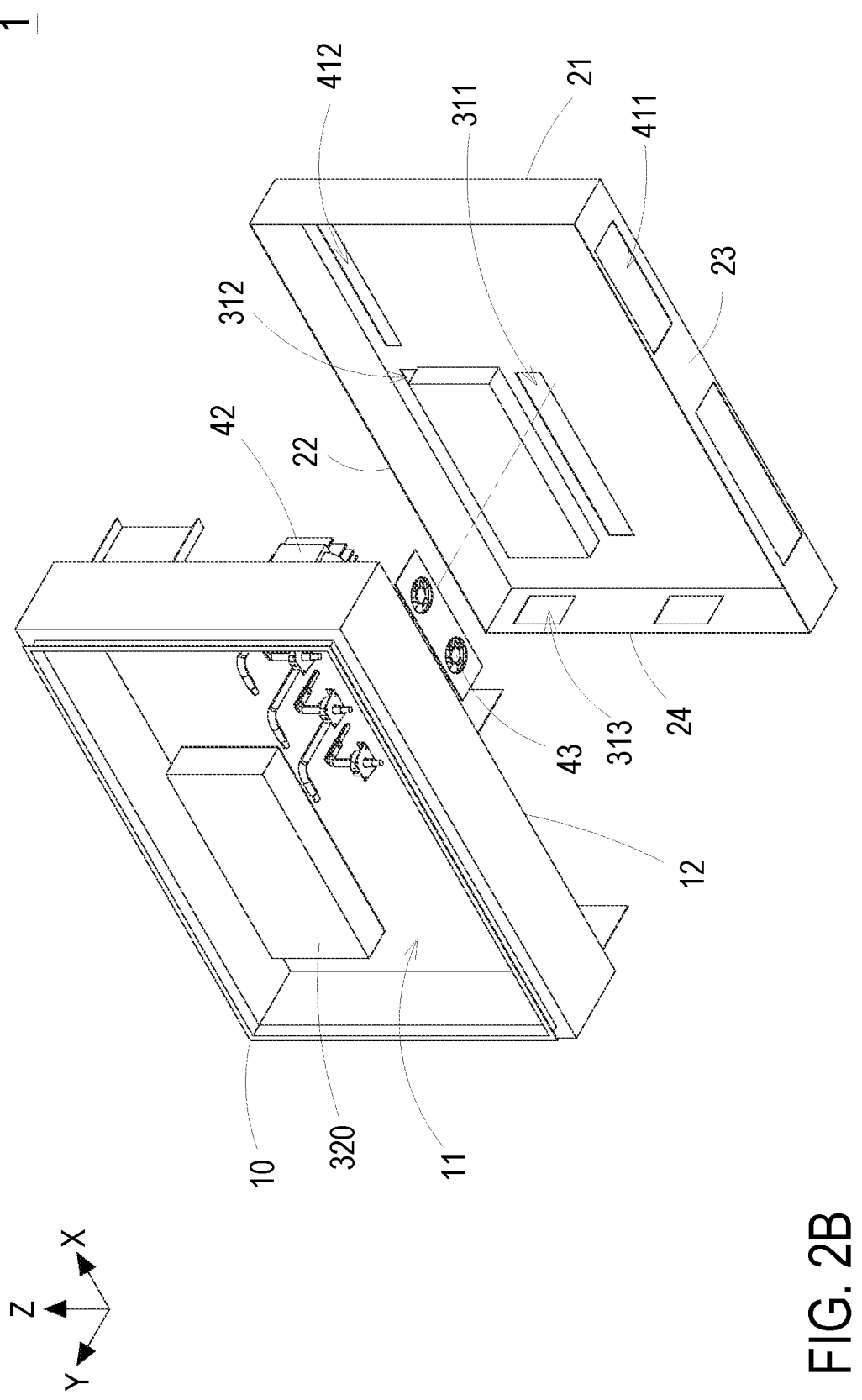
Figure 3:
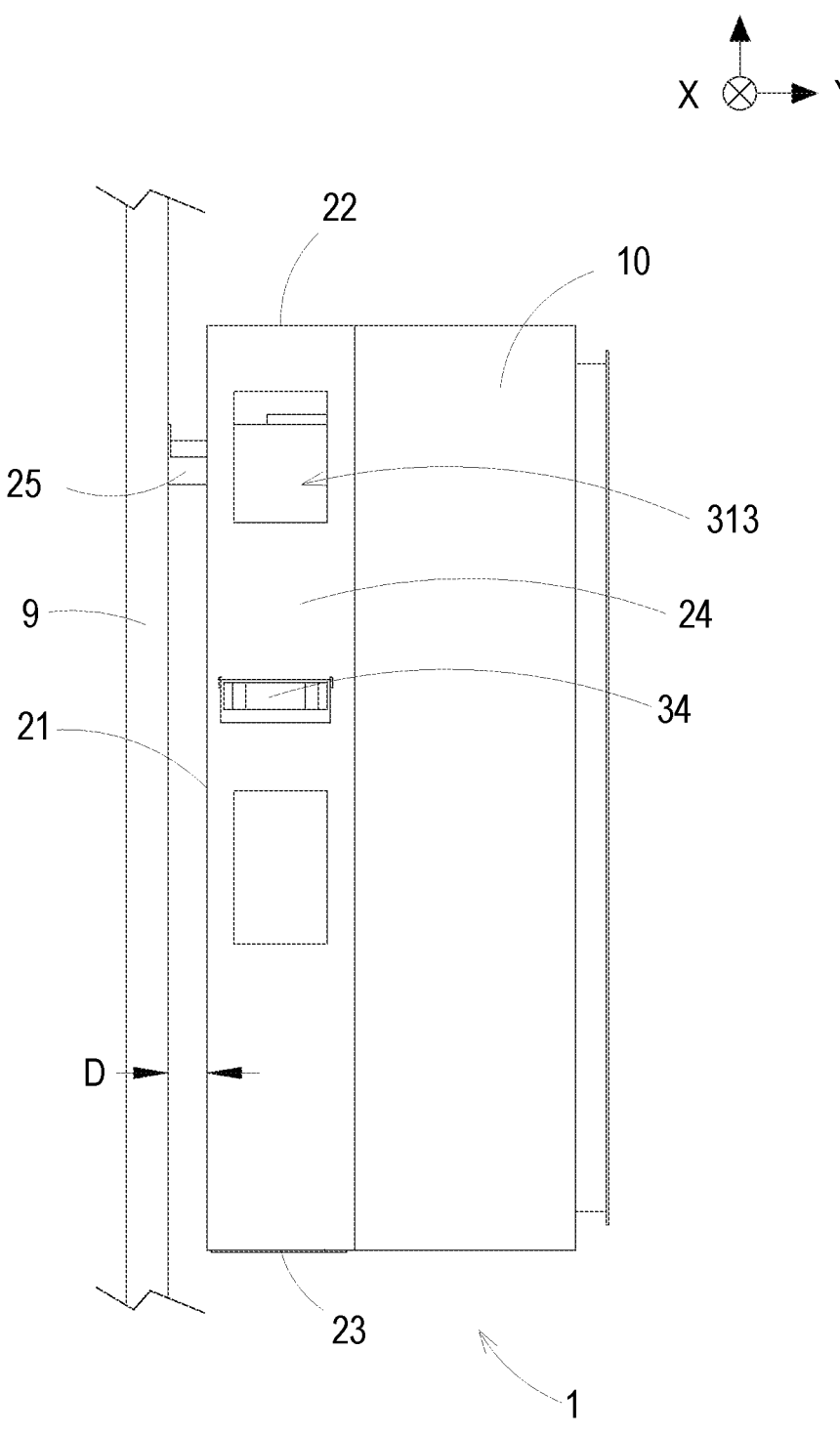
FIG. 3 is a lateral view illustrating the photovoltaic-inverter heat-dissipation assembly mounted on a wall according to the first embodiment of the present disclosure.
Figure 4:
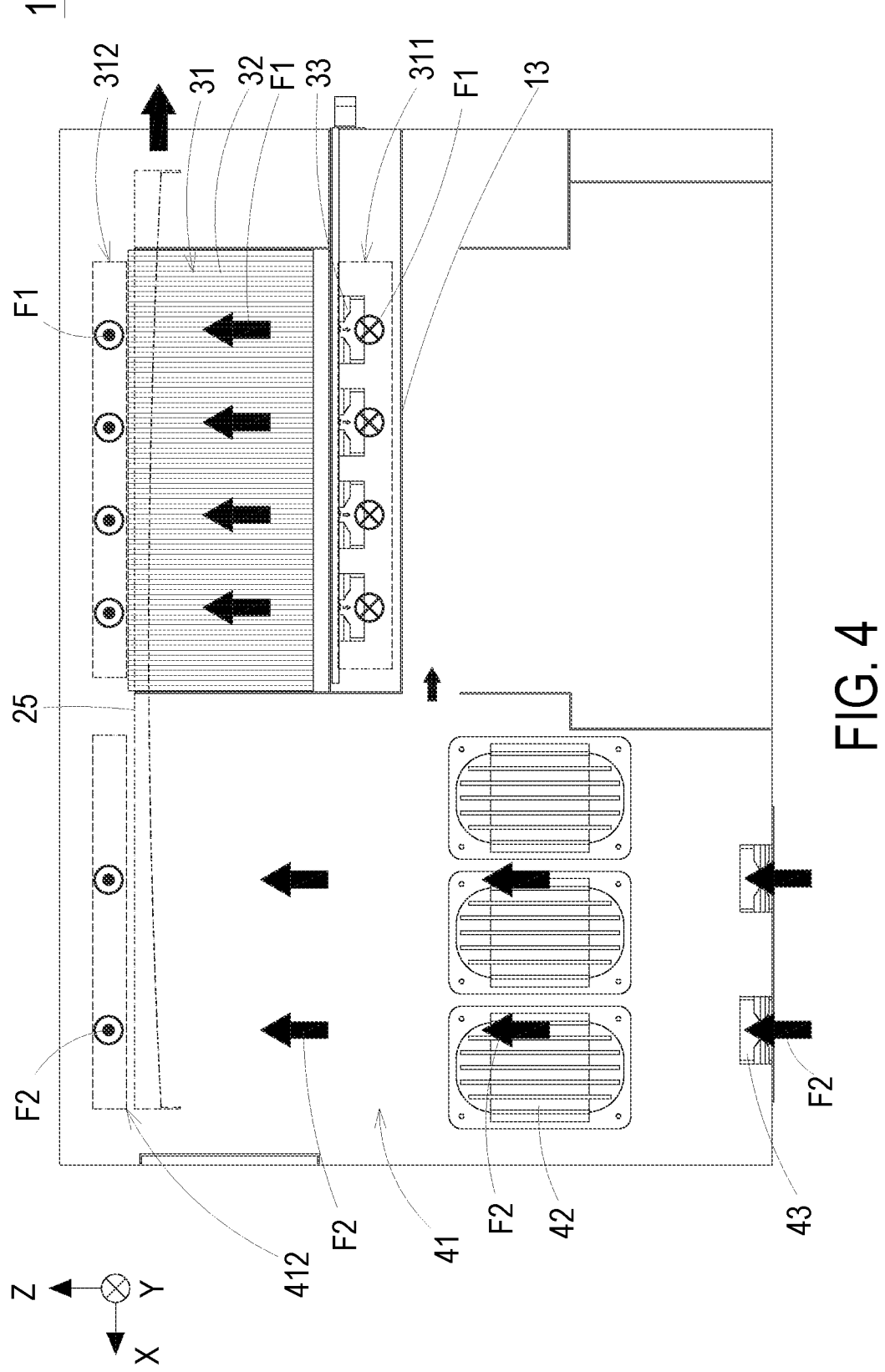
FIG. 4 is a schematic diagram showing the flow directions of the airflows in the rear chamber of the photovoltaic-inverter heat-dissipation assembly according to the first embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "front," "rear" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments.

Please refer to FIG. 1 to FIG. 4. A photovoltaic-inverter heat-dissipation assembly is illustrated according to a first embodiment of the present disclosure. In the embodiment, the photovoltaic-inverter heat-dissipation assembly 1 is provided and includes a front housing-base 10, a rear cover 20, a first heat-generating device 32, a first fan 33, a second heat-generating device 42 and a second fan 43. The front housing-base 10 includes a front chamber 11, a rear mounting surface 12 and a partition element 13. In the embodiment, the partition element 13 is disposed on the rear mounting surface 12. The rear cover 20 is combined with the partition element 13 and the rear mounting surface 12 of the front housing-base 10 to form a first heat-dissipation space 31 and a second heat-dissipation space 41 separated from each other. In the embodiment, the rear cover 20 includes a first air-inlet 311, a second air-inlet 411 and at least one air-outlet. The first air-inlet 311 and the second air-inlet 411 are disposed separately from each other. Preferably but not exclusively, the at least one air-outlet includes a first air-outlet 312 and a second air-outlet 412 spatially corresponding to the first heat-dissipation space 31 and the second heat-dissipation space 41, respectively. In the embodiment, the first air-inlet 311 is in communication with the first air-outlet 312 through the first heat-dissipation space 31, and the second air-inlet 411 is in communication with the second air-outlet 412 through the second heat-dissipation space 41. In addition, the first heat-generating device 32 is disposed on the rear mounting surface 12 of the front housing-base 10 and accommodated in the first heat-dissipation space 31. The first fan 33 is disposed adjacent to the first air-inlet 311, located between the first air-inlet 311 and the first heat-generating device 32, and configured to generate a first airflow F1. Preferably but not exclusively, the first airflow F1 enters the first heat-dissipation space 311 through the first air-inlet 311, flows through the first heating-generating device 32, and flows out through the first air-outlet 312. The second heat-generating device 42 is disposed on the rear mounting surface 12 of the front housing-base 10 and accommodated in the second heat-dissipation space 41. The second fan 43 is disposed adjacent to the second air-inlet 411, located between the second air-inlet 411 and the second heat-generating device 42, and configured to generate a second airflow F2. Preferably but not exclusively, the second airflow F2 enters the second heat-dissipation space 41 through the second air-inlet 411, flows through the second heat-generating device 42, and flows out through the second air-outlet 412.

In the embodiment, the rear cover 20 includes a backbone 21 spatially corresponding the rear mounting surface 12 of the front housing-base 10, to a wall plane, and the photovoltaic-inverter heat-dissipation assembly is hung on the wall plane through the backbone. Preferably but not exclusively, the backbone 21 is connected to the outer periphery of the rear mounting surface 12 of the front housing-base 10 through a top plane 22, a bottom plane 23 and a lateral plane 24 of the rear cover 20. In addition, the backbone 21 of the rear cover 20 is spatially corresponding to a wall plane 9. The photovoltaic-inverter heat-dissipation assembly 1 is hung and fixed on the wall plane 9 through the backbone 21 for use. In the embodiment, the first air-inlet 311 is disposed on the backbone 21 of the rear cover 20. The second air-inlet 411 is disposed on the bottom plane 23 of the rear cover 20. Notably, when the front housing-base 10 and the rear cover 20 of the photovoltaic-inverter heat-dissipation assembly 1 of the present disclosure, the space of the rear chamber between the front housing-base 10 and the rear cover 20 is further divided according to the design of the partition element 13, and divided into at least two independent spaces, such as the first heat-dissipation space 31 and the second heat-dissipation space 41 which are isolated from each other. The first heat-dissipation space 31 has the first fan 33 and the first air-inlet 311 disposed independently thereon, and the second heat-dissipation space 41 has the second fan 43 and the second air-inlet 411 disposed independently thereon. The first air-inlet 311 in communication with to the first heat-dissipation space 31 is disposed on the backbone 21. Preferably but not exclusively, the first air-inlet 311 has an opening direction along the reverse Y axial direction. The second air-inlet 411 in communication with the second heat-dissipation space 41 is disposed on the bottom plane 23. Preferably but not exclusively, the second air-inlet 411 has an opening direction the reverse Z axial direction.

In the embodiment, when the first fan 33 corresponding to the first heat-dissipation space 31 is activated, the first airflow F1 generated enters the first heat dissipation space 31 through the first air-inlet 311 along the Y axial direction, then the first airflow F1 flows through the first heat-generating device 32 along the Z axial direction, and finally the first airflow F1 flows out through the first air-outlet 312 along the reverse Y axial direction. In addition, when the second fan 43 corresponding to the second heat-dissipation space 41 is activated, the second airflow F2 generated enters the second heat-dissipation space 41 through the second air-inlet 411 along the Z axial direction, then the second airflow F2 flows through the second heat-generating device 42 along the Z axial direction, and finally the second airflow F2 flows out through the second air-outlet 412 along the direction reverse Y axial direction. In the embodiment, the discharging flow directions (i.e., the reverse Y axial direction) of the first airflow F1 at the first air-outlet 312 and the second airflow F2 at the second air-outlet 412 are the same, but different from the suction flow direction (i.e., the Y axial direction) of the first airflow F1 at the first air-inlet 311. Moreover, the discharging flow directions (i.e., the reverse Y axial direction) of the first airflow F1 at the first air-outlet 312 and the second airflow F2 at the second air-outlet 412 are different from the suction flow direction (i.e., the Z axial direction) of the second airflow F2 at the second air-inlet 411. Furthermore, the opening direction of the first air-inlet 311 and the opening direction of the second air-inlet 411 are different. In this way, it facilitates to reduce the interference of the first airflow F1 and the second airflow F2 during inflow. Thus, the stability of the air intake of each independent airflow is maintained.

In the embodiment, the rear cover 20 further includes an auxiliary air-outlet 313 arranged on the lateral plane 24 of the rear cover 20, and disposed adjacent to the top plane 22 of the rear cover 20. Preferably but not exclusively, the first air-inlet 311 is located between the auxiliary air-outlet 313 and the second air-inlet 411. After dissipating the heat of the first heat-generating device 32 and the second heat-generating device 42, the first airflow F1 and the second airflow F2 are discharged out through the first air-outlet 312, the second air-outlet 412 and the auxiliary air-outlet 313. The heat-dissipation performance of the first airflow F1 acting on the first heat-generating device 32 and the heat-dissipation performance of the second airflow F2 acting on the second heat-generating device 42 are not affected. Moreover, in the embodiment, the first fan 33 includes a plurality of first fans 33, which are arranged in a row, detachably disposed the rear cover 20 through an opening 314 on the lateral plane 24, and located between the first air-inlet 311 and the first-heat dissipation space 31. The first fans 33 arranged in the row further include a handle 34 disposed on one side of the plurality of first fans 33, so as to facilitate the user to install or remove the first fans 33. Certainly, the present disclosure is not limited thereto.

In the embodiment, the rear cover 20 further includes a retaining wall 25, which is arranged outside the backbone 21. Preferably but not exclusively, the retaining wall 25 is extended laterally along the X axial direction between the two lateral planes 24, and configured to connect to the wall plane 9 in a direction (i.e., the reverse Y axial direction) from the backbone 21 toward the wall plane 9. In the embodiment, the at least one air-outlet is disposed on the backbone 21 and includes a first air-outlet 312 and a second air-outlet 412 extended along the X axial direction and adjacent to the top plane 23 of the rear cover 20. Preferably but not exclusively, the first air-outlet 312 and the second air-outlet 412 are in communication with each other. In other embodiments, the first air-outlet 312 and the second air-outlet 412 are connected and integrally formed into one piece, extended along the X axial direction and arranged adjacent to the top plane 23. The type of the at least one air-out in the present disclosure is adjustable according to the practical requirements, and not limited thereto. Notably, the retaining wall 25 disposed outside the backbone 21 is located between the first air-outlet 312, the second air-outlet 412 and the first air-inlet 311, so as to provide a function of compartmentalizing airflow.

In the embodiment, since the structure of retaining wall 25 is disposed between the first air-inlet 311 and the first air-outlet 312 and between the second air-inlet 411 and the second air-outlet 412, when photovoltaic-inverter heat-dissipation assembly 1 is connected and fixed to the wall plane 9 through the retaining wall 25, the backbone 21 and the wall plane 9 are arranged parallel to each other, and a spaced distance D, such as 40 mm, is maintained between the backbone 21 and the wall plane 9. In that, a sufficient space is provided between the backbone 21 and the wall plane 9 for air flow. Moreover, the structure of the retaining wall 25 is located between the first air-outlet 312 and the first air-inlet 311 and between the second air-outlet 412 and the second air-inlet 411, and it facilitates to prevent the airflow flowing through the upper air-outlet from flowing back to the lower air-inlet. In other words, cooperating with the retaining wall 25 arranged between the first air-outlet 312 and the first air-inlet 311 and between the second air-outlet 412 and the second air-inlet 411, the interference of the airflow is reduced, and the generation of heat-dissipation air backflow is avoided, so as to achieve the optimization of each independent airflow.

In the embodiment, the front housing-base 10 further includes a front chamber 11, and the rear mounting surface 12 is located between the front chamber 11 and the partition element 13. Preferably but not exclusively, the first heat-generating device 32 is a first heat sink thermally coupled to the active component, such as an inverter module 320 accommodated in the front chamber 11, through the rear mounting surface 12. Preferably but not exclusively, the second heat-generating device 42 a choke device, such as an inverter choke. It should be noted that the heat-generating device mentioned in the present disclosure is not limited to generation through heat-transfer or self-heating, but refers to a heat-generating device that requires heat dissipation. The present disclosure is not limited thereto and not redundantly described herein. In the embodiment, since the heat of the first heat-generating device 32 and the second heat-generating device 42 is independently dissipated through the first heat-dissipating space 31 and the second heat-dissipating space 41 respectively, it helps to exert the best heat-dissipating performance. In other embodiments, the front chamber 11 of the front housing-base 10 is used to accommodate the active components or the passive components with the requirements of waterproof and dustproof, and the active components or the passive components are further thermally coupled to the heat sink accommodated in the rear chamber to dissipate heat through the airflow. On the other hand, the active components or the passive components without the requirements of waterproof and dustproof are accommodated in the rear chamber to dissipate the heat through the airflow. Certainly, the arrangement of the first heat-generating device 32 and the second heat-generating device 42 are adjustable according to the practical requirements. The present disclosure is not limited thereto.

Figure 5A:
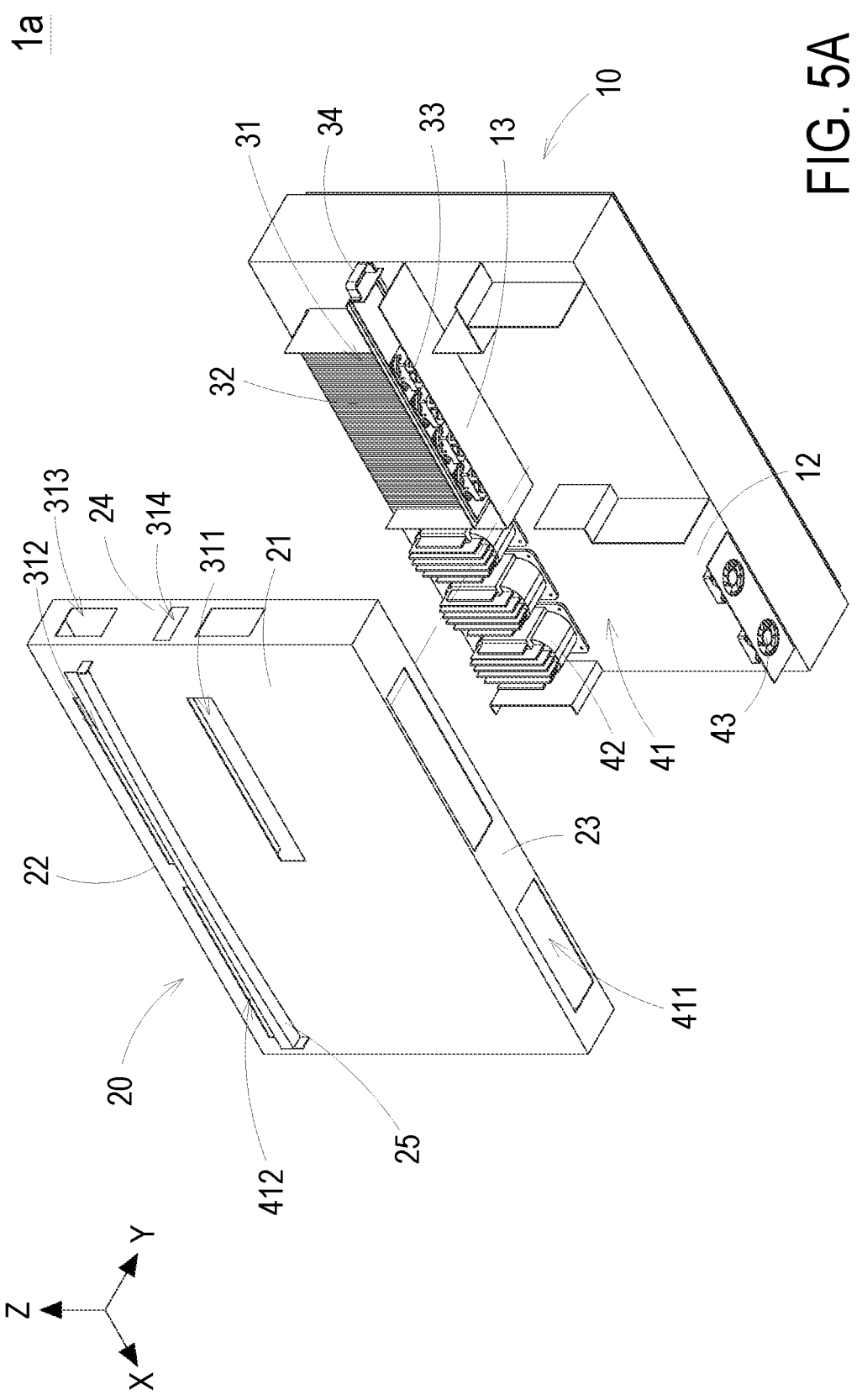
FIGS. 5A and 5B are exploded views illustrating a photovoltaic-inverter heat-dissipation assembly according to a second embodiment of the present disclosure.
Figure 5B:
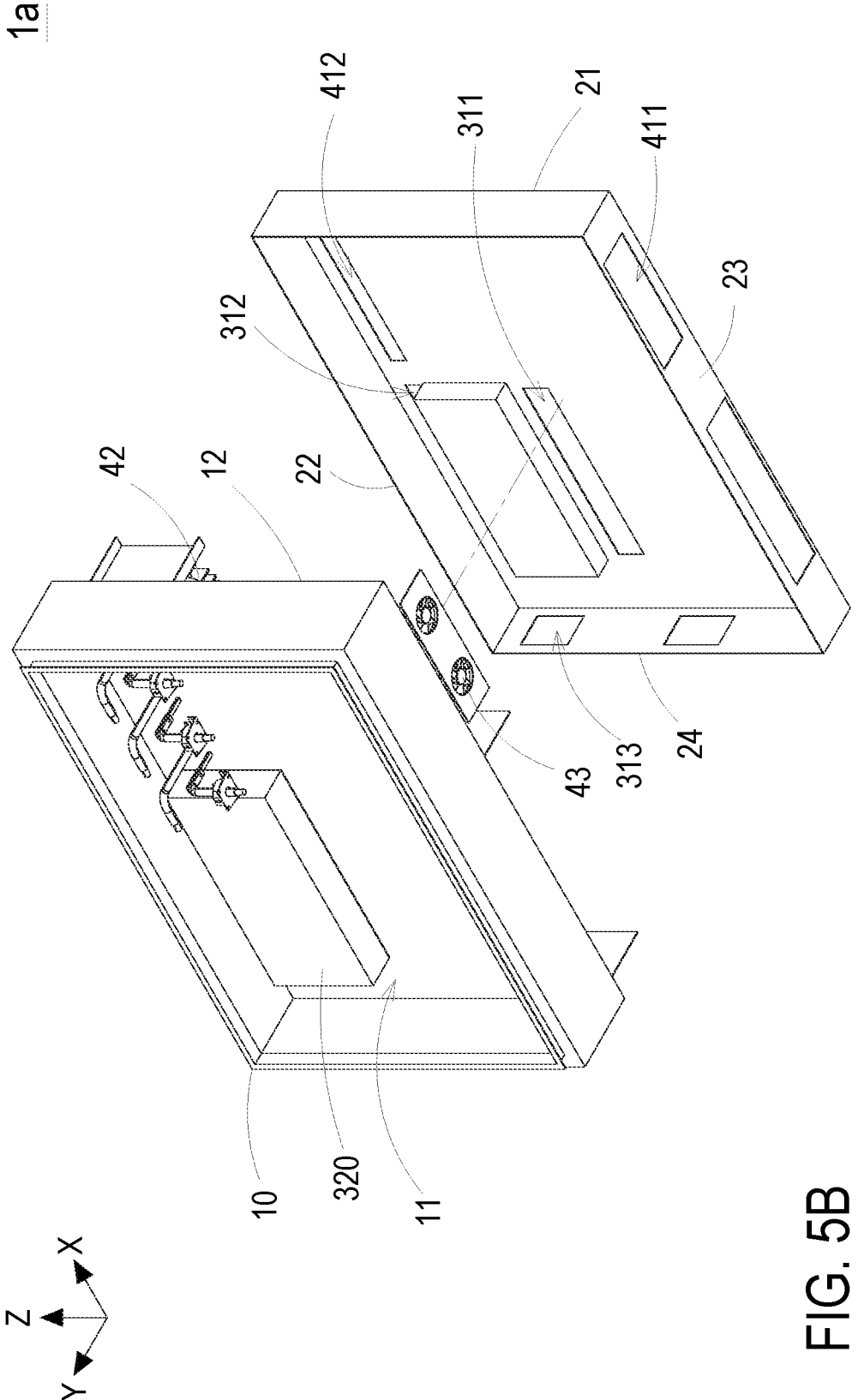
Figure 6:
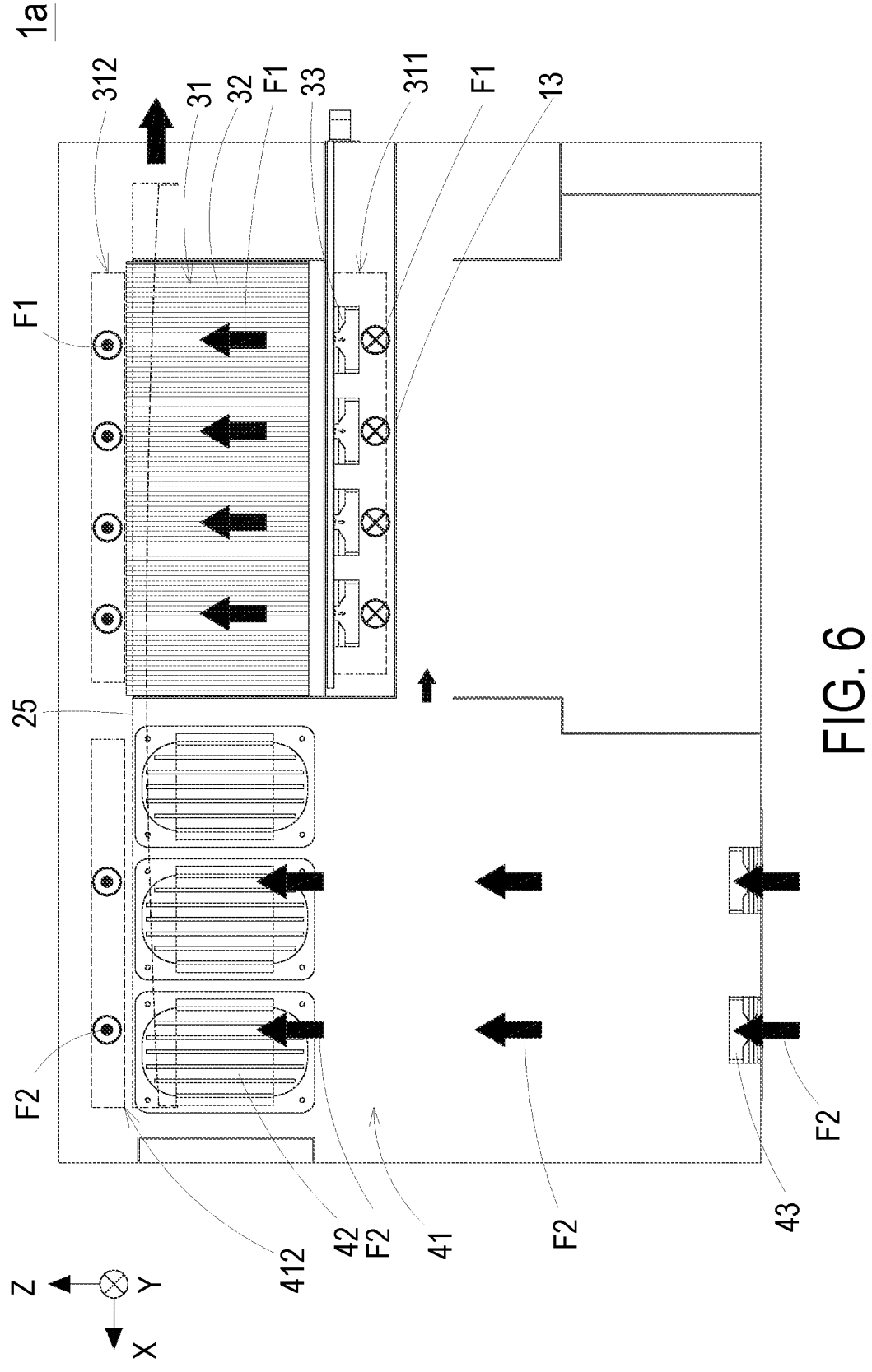
FIG. 6 is a schematic diagram showing the flow directions of the airflows in the rear chamber of the photovoltaic-inverter heat-dissipation assembly according to the second embodiment of the present disclosure.

FIG. 5A, FIG. 5B and FIG. 6 illustrate a photovoltaic-inverter heat-dissipation assembly according to a second embodiment of the present disclosure. In the embodiment, the structures, elements and functions of the photovoltaic-inverter heat-dissipation assembly 1a are similar to those of the photovoltaic-inverter heat-dissipation assembly 1 of FIG. 1 to FIG. 4, and are not redundantly described herein. Different from the first embodiment where the second heat-generating device 42 is disposed on a lower portion of the second heat-dissipation space 41, in the embodiment, the second heat-generating device 42 is disposed on a upper portion of the second-heat dissipation space 41, located adjacent to the top plane 22 and the second air-outlet 412 of the rear cover 20, and arranged with the first heat-generating device 32 side by side. The lower space of the rear cover 20 can be used for arranging other device or be omitted, so as to improve the overall power density. Preferably but not exclusively, in the embodiment, the first heat-generating device 32 is a heat sink and thermally coupled to an inverter module 320 accommodated in the front chamber 11 through the rear mounting surface 12. Preferably but not exclusively, the second heat-generating device 42 is a choke device, such as an inverter choke. Since the first heat-dissipation space 31 and the second heat-dissipation space 4241 are independent and separated from each other, the first heat-generating device 31 and the second heat-generating device 4142 can be arranged correspondingly and accommodated, respectively, to achieve the best heat dissipation performance and improve the overall power density at the same time. Certainly, the present disclosure is not limited thereto.

Figure 7:
FIG. 7 is a perspective structural view illustrating a photovoltaic-inverter heat-dissipation assembly according to a third embodiment of the present disclosure.
Figure 7:
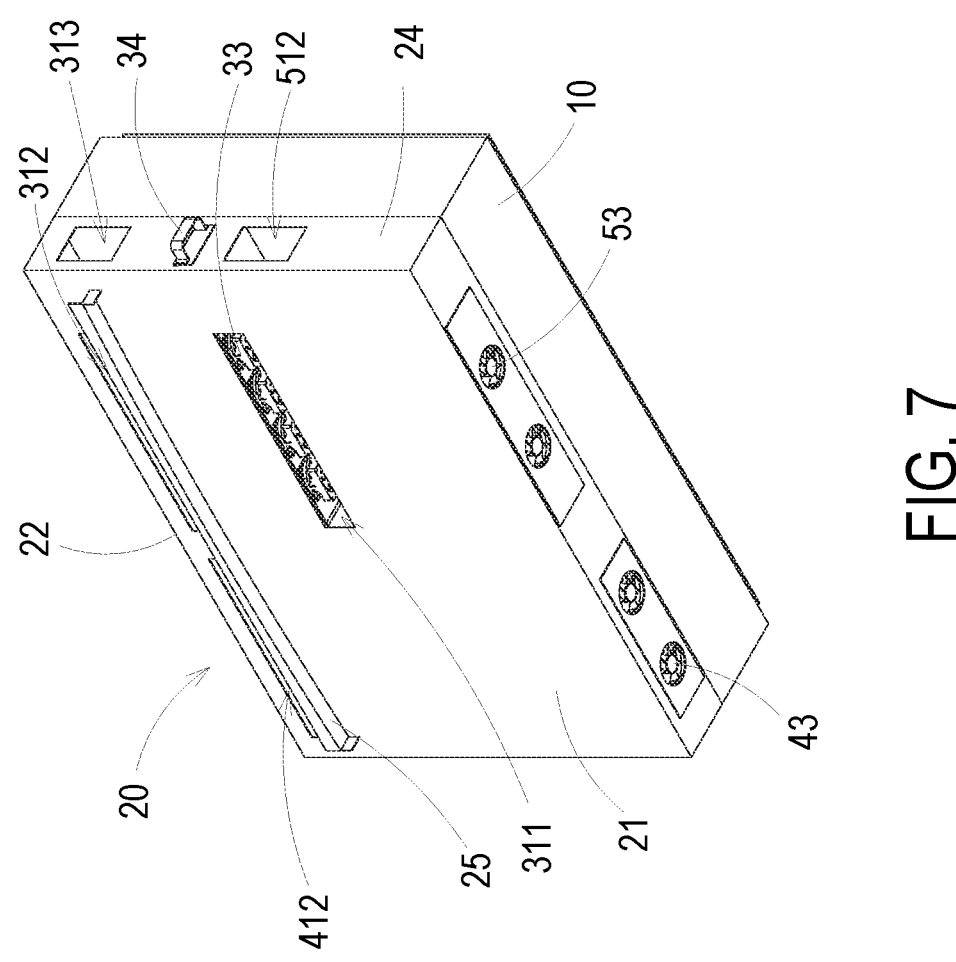
Figure 8A:
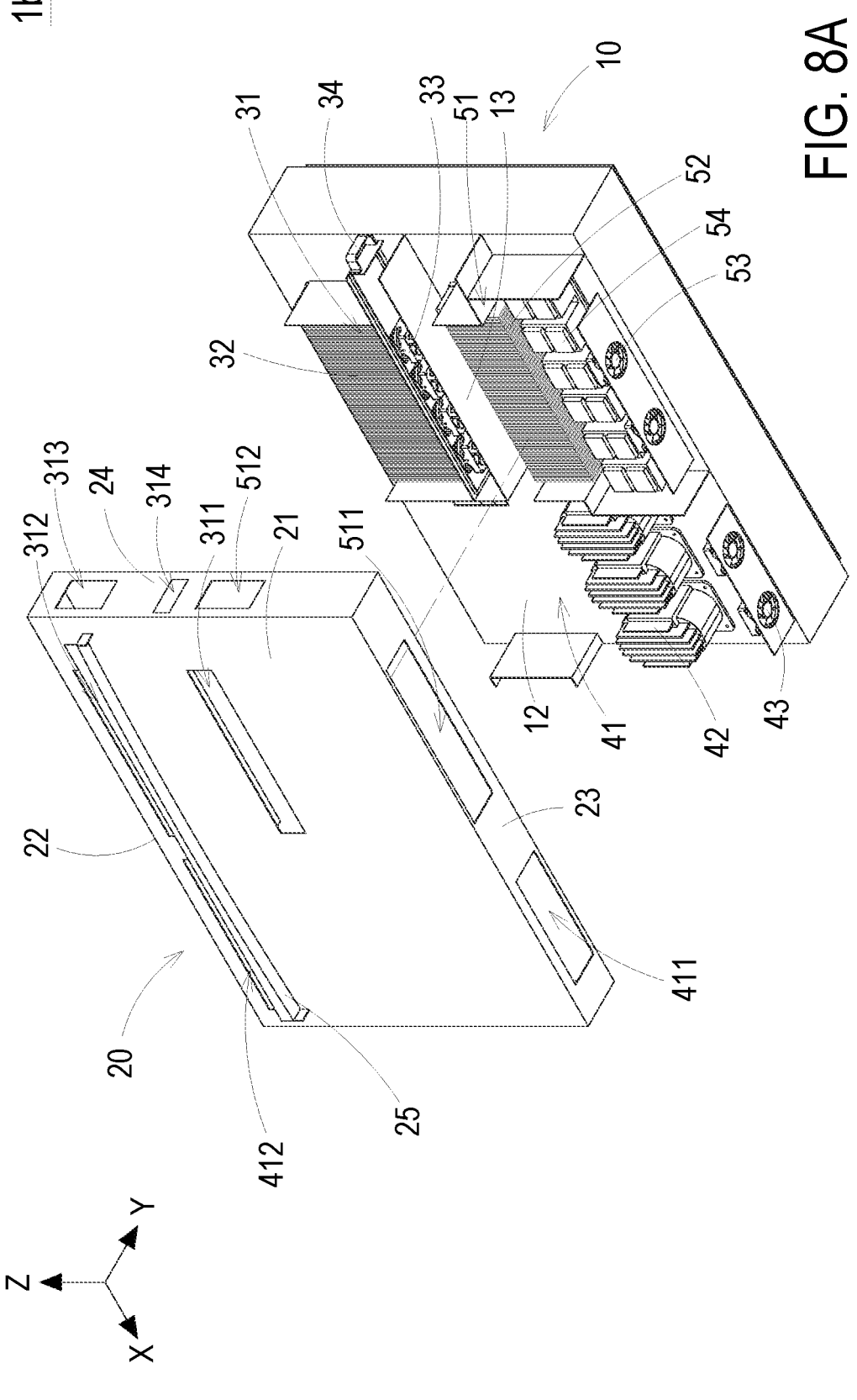
FIGS. 8A and 8B are exploded views illustrating the photovoltaic-inverter heat-dissipation assembly according to the third embodiment of the present disclosure.
Figure 8B:
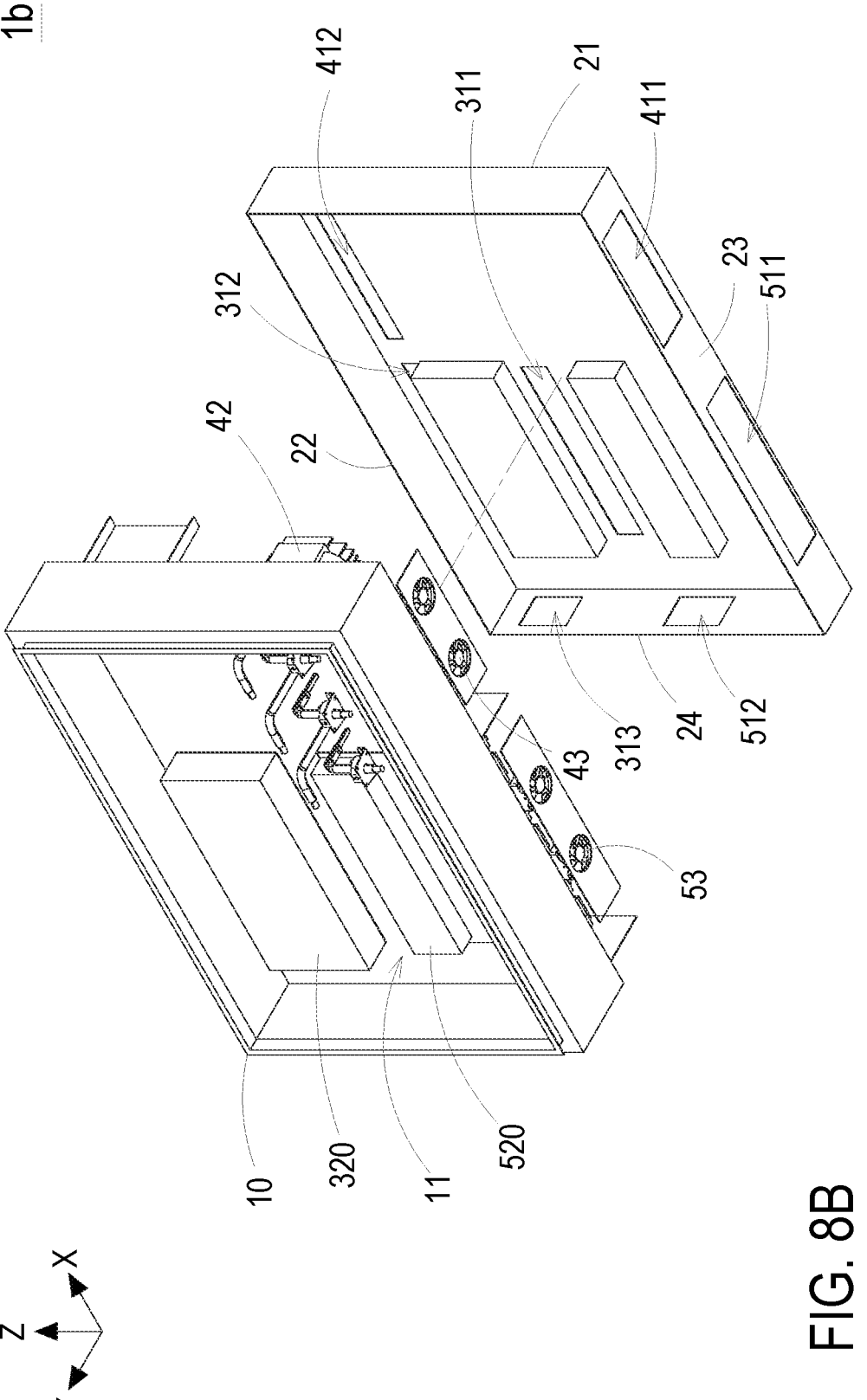
Figure 9:
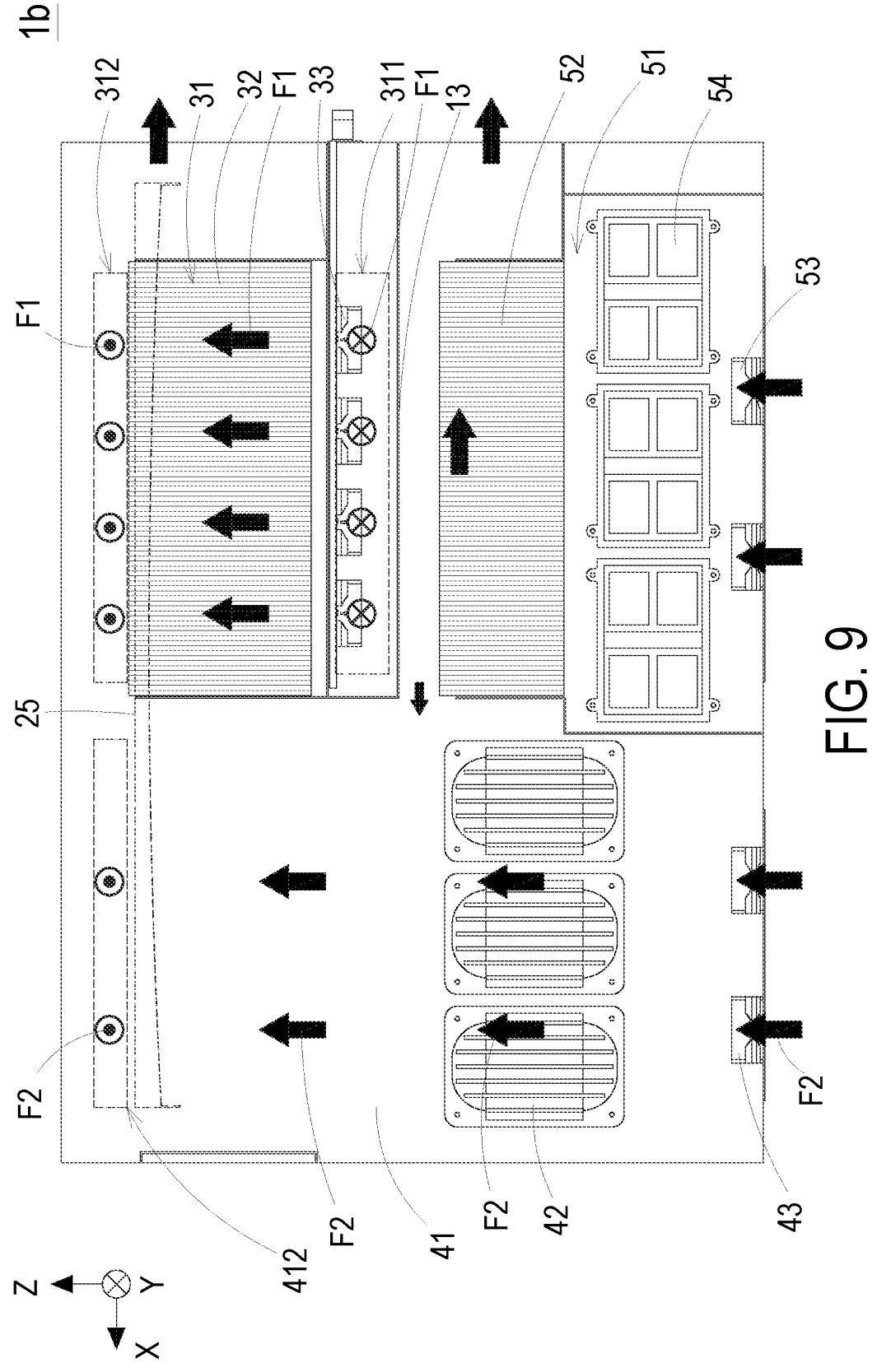
FIG. 9 is a schematic diagram showing the flow directions of the airflows in the rear chamber of the photovoltaic-inverter heat-dissipation assembly according to the third embodiment of the present disclosure.

FIG. 7 to FIG. 9 illustrate a photovoltaic-inverter heat-dissipation assembly according to a third embodiment of the present disclosure. In the embodiment, the structures, elements and functions of the photovoltaic-inverter heat-dissipation assembly 1a are similar to those of the photovoltaic-inverter heat-dissipation assembly 1 of FIG. 1 to FIG. 4, and are not redundantly described herein. In the embodiment, the photovoltaic-inverter heat-dissipation assembly 1b further includes a third heat-generating device, such as a second heat sink 52 and a boost choke 54, and a third fan 53. The rear cover 20 is combined with the partition element 13 and the rear mounting surface 12 of the front housing-base 10 to form a first heat-dissipation space 31, a second heat-dissipation space 41 and a third heat-dissipation space 51, which are separated from each other. The first air-inlet 311 is disposed between the first heat-dissipation space 31 and the third heat-dissipation space 51. In addition, the first air-inlet 311 and the third heat-dissipation space 51 are isolated from each other and not in communication with each other. In the embodiment, the rear cover 20 further includes a third air-inlet 511 and a third air-outlet 512. The second heat sink 52 and the boost choke 54 served as the third heat-generating device are disposed on the rear mounting surface 12 and accommodated in the third heat-dissipation space 51. The third fan 53 is disposed adjacent to the third air-inlet 511, located between the third air-inlet 511 and the third heat-generating device, and configured generate a third airflow F3, which enters the third heat-dissipation space 51 through the third air-inlet 511, flows through the third heat-generating device, and flows out through the third air-outlet 512.

In the embodiment, the first heat-dissipation space 31, the second heat-dissipation space 41 and the third heat-dissipation space 51 are three independent heat-dissipation spaces, and the first heat-generating device 32, the second heat-generating device 42 and the third heat-generating device are accommodated in three independent heat-dissipation spaces, respectively. For the arrangement of many active components and passive components in the solar photovoltaic, the first heat-generating device 32 is for example but not limited to the first heat sink accommodated in the first heat-dissipation space 31, and thermally coupled to an inverter module 320 accommodated in the front chamber 11 through the rear mounting surface 12. The second heat-generating device 42 is for example but not limited to a choke device such as an inverter choke, disposed on the rear mounting surface 12 and accommodated in the second heat-dissipation space 41. In addition, the active components such as the boost module, IGBT, and MOSFETF semiconductor switching device, or the passive components such as the capacitor, the boost choke and the resistor required by the photovoltaic inverters can be regarded as the third heat-generating device and arranged in to the third heat-dissipation space 51 correspondingly. Preferably but not exclusively, in the embodiment, the electronic components of the booster module 520 is installed in the front chamber 11 of the front housing-base 10 due to the requirement of waterproof and dustproof, and is thermally coupled to the second heat sink 52 through the rear mounting surface 12, so as to dissipate the heat through the third airflow F3. In addition, the boost choke 54 can also be accommodated in the third heat-dissipation space 51 to dissipate the heat through the third airflow F3. When the first fan 33 corresponding to the first heat-dissipation space 31 is activated, the first airflow F1 generated enters the first heat-dissipation space 31 through the first air-inlet 311 along the Y axial direction, then the first airflow F1 flows through the first heat-generating device 32 along the Z axial direction, and finally the first airflow F1 flows out through the first air-outlet 312 along the reverse Y axial direction. When the second fan 43 corresponding to the second heat-dissipation space 41 is activated, the second airflow F2 generated enters the second heat-dissipation space 41 through second air-inlet 411 along the Z axial direction, then the second airflow F2 flows through the second heat-generating device 42 along the Z axial direction, and finally the second airflow F2 flows out through the second air-outlet 412 along the reverse Y axial direction. Moreover, when the third fan 53 corresponding to the third heat-dissipation space 51 is activated, the third airflow F3 generated enters the third heat-dissipation space 51 through the third air-inlet 511 along the Z axial direction, then the third airflow F3 flows through the third heat-generating device such as the second heat sink 52 and the boost choke 54, and finally the third airflow F3 flows out through the third air-outlet 512 along the reverse X axial direction. The first airflow F1, the second airflow F2 and the third airflow F3 are independent, and the first airflow F1 and the third airflow F3 are more completely isolated and do not interfere with each other. In the embodiment, the second heat-dissipation space 41 is partially in communication with the third heat-dissipation space 51, and the second airflow F2 that completes the heat dissipation of the second heat-generating device 42 and the third airflow F3 that completes the heat dissipation of the third heat-generating device are partially mixed. Then, the mixed airflow is discharged from the second air-outlet 412 without affecting the heat dissipation performance of the second airflow F2 acted on the second heat-generating device 42 or the heat dissipation performance of the third airflow F3 acted on the third heat-generating device.

Figure 10A:
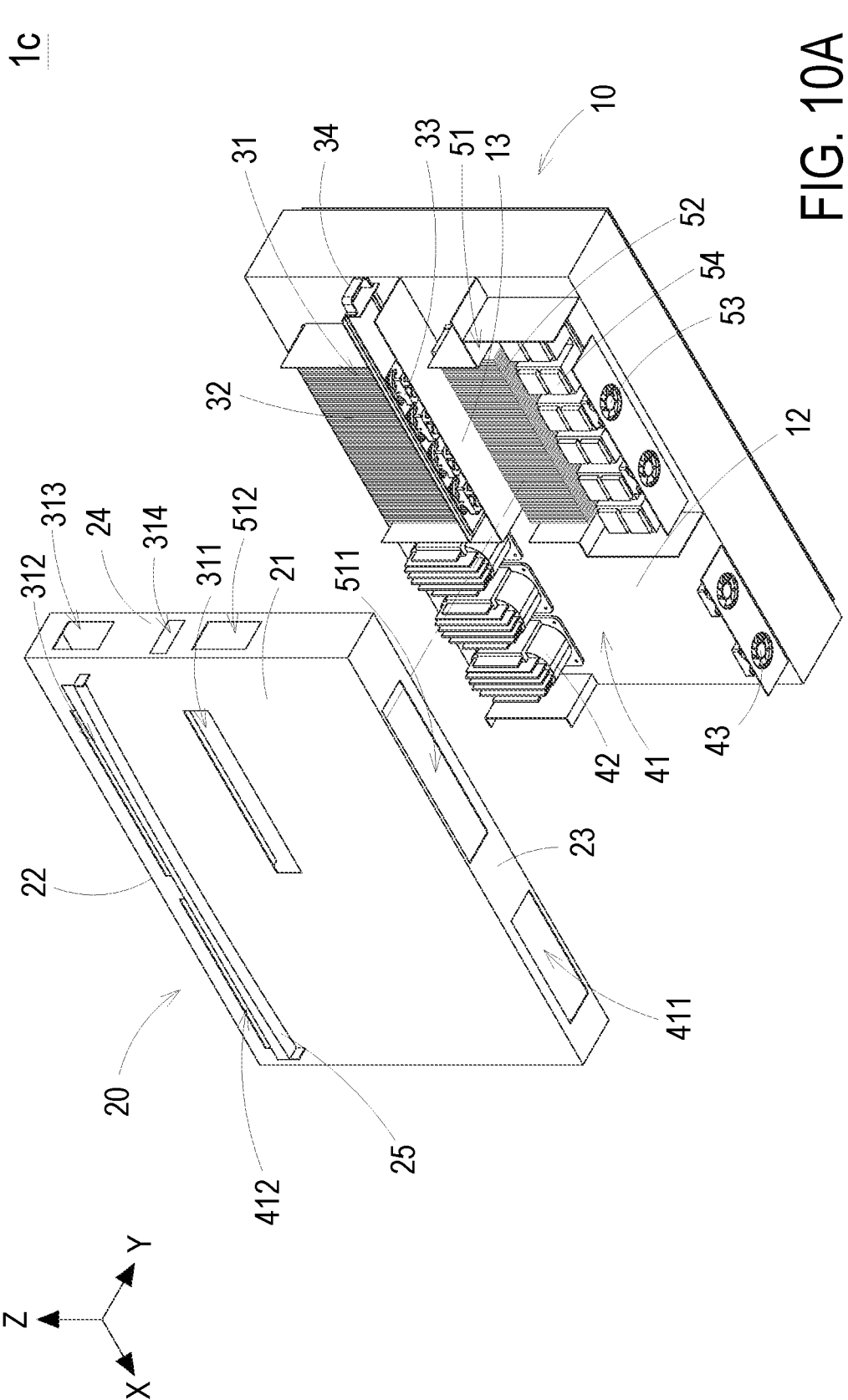
FIGS. 10A and 10B are exploded views illustrating a photovoltaic-inverter heat-dissipation assembly according to a fourth embodiment of the present disclosure.
Figure 10B:
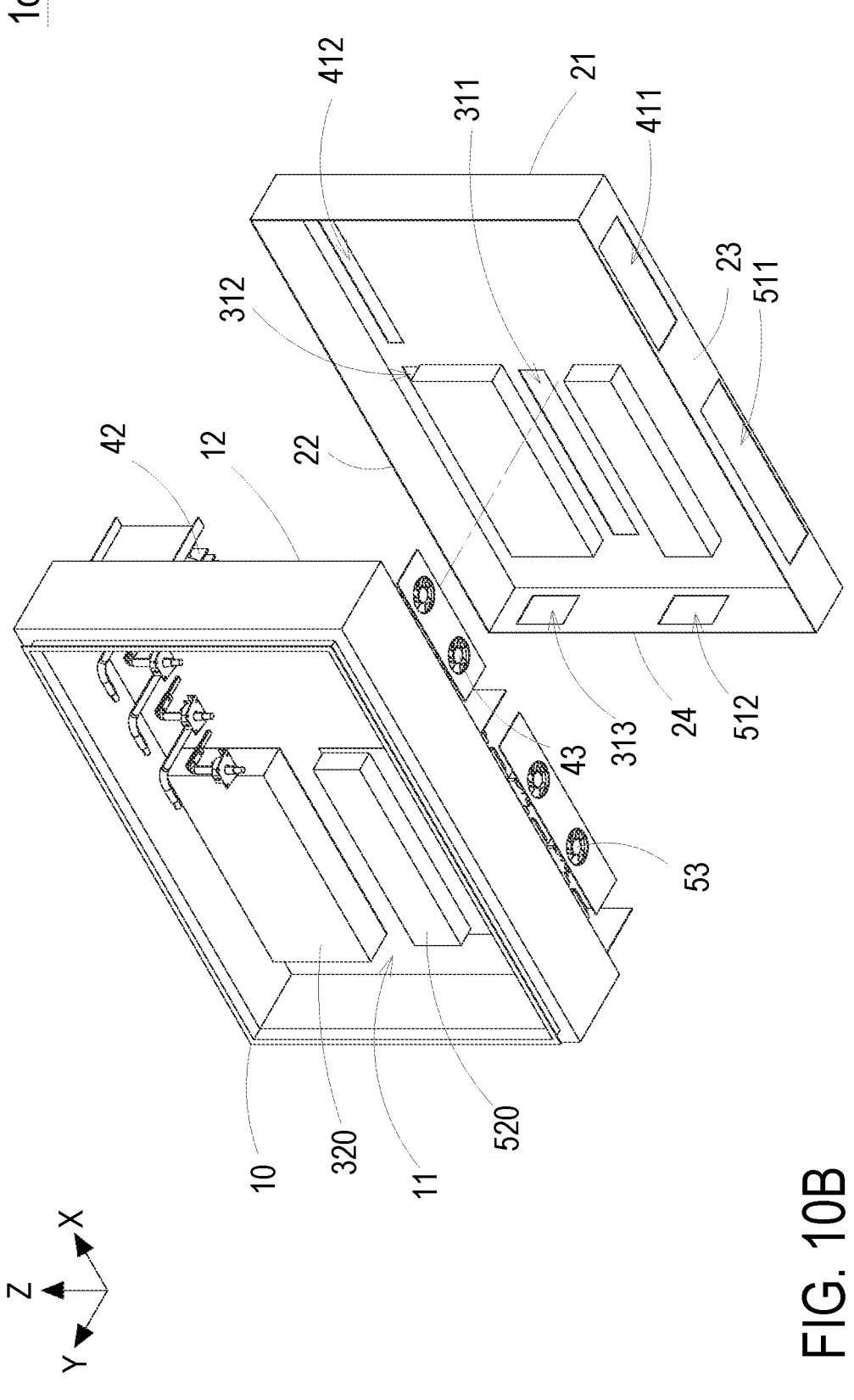
Figure 11:
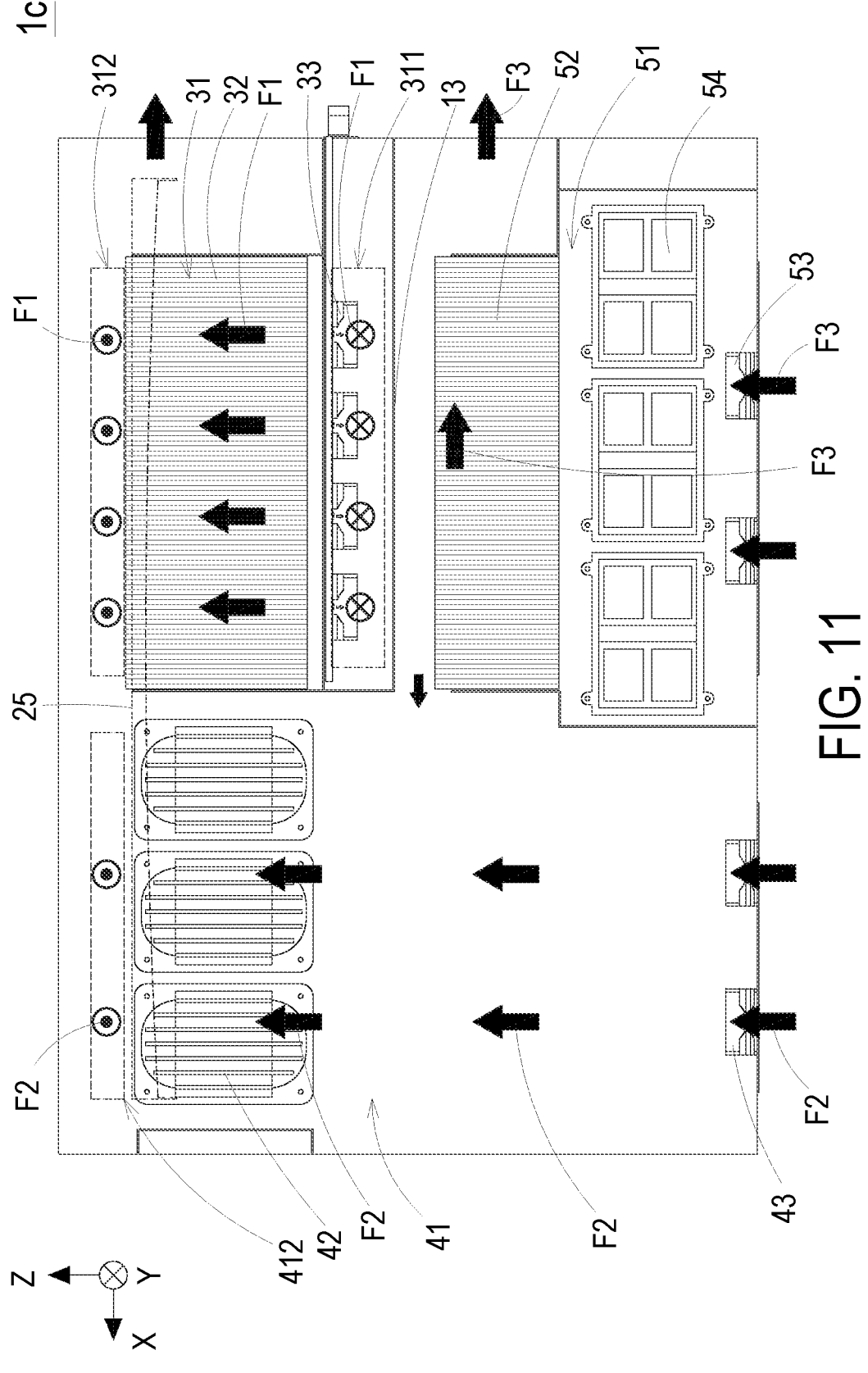
FIG. 11 is a schematic diagram showing the flow directions of the airflows in the rear chamber of the photovoltaic-inverter heat-dissipation assembly according to the fourth embodiment of the present disclosure.

FIG. 10A, FIG. 10B and FIG. 11 illustrate a photovoltaic-inverter heat-dissipation assembly according to a fourth embodiment of the present disclosure. In the embodiment, the structures, elements and functions of the photovoltaic-inverter heat-dissipation assembly 1c are similar to those of the photovoltaic-inverter heat-dissipation assembly 1b of FIG. 7 to FIG. 9, and are not redundantly described herein. Preferably but not exclusively, in the embodiment, the first heat-generating device 32 is a first heat sink and thermally coupled to an inverter module 320 accommodated in the front chamber 11 through the rear mounting surface 12. Preferably but not exclusively, the second heat-generating device 42 is a choke device of an inverter choke, which is accommodated in the second heat-dissipation space 41 and disposed adjacent to the top plane 22 and the second air-outlet 412 of the rear cover 20. The second heat-generating device 42 accommodated in the second heat-dissipation space 41 and the first heat-generating device 32 accommodated in the first heat-dissipation space 31 are separated from each other left and right. Preferably but not exclusively, the third heat-generating device includes a second heat sink 52 and a boost choke 54. The third heat-generating device accommodated in the third heat-dissipation space 41 and the first heat-generating device 31 accommodated in the first heat-dissipation space 31 are isolated from each other up and down. The opening direction of the third air-outlet 512 is different from the opening direction of the first air-inlet 311 and also different from the opening direction of the second air-inlet 411. In this way, it is helpful to avoid the backflow of airflow for heat dissipation. Similarly, with the retaining wall 25 arranged between the first air-outlet 312 and the first air-inlet 311 and between the second air-outlet 412 and the second air-inlet 411, it also helps to reduce the interference of the airflows. At the same time, the generation of hot air backflow is avoided, and the optimization of each independent airflow is achieved.

Notably, in the present disclosure, when the front housing-base 10 and the rear cover 20 of the photovoltaic-inverter heat-dissipation assembly 1 are assembled, the space between the front housing-base 10 and the rear cover 20 is divided according to the design of the partition element 13. The rear chamber is divided into at least two heat-dissipation spaces that are isolated from each other. Preferably but not exclusively, the space is divided to form a horizontal isolation of the first heat-dissipation space 31 and the second heat-dissipation space 41, or the vertical isolation of the first heat-dissipation space 31 and the third heat-dissipation space 51. The arrangement of the isolated heat-dissipation spaces is adjustable according to the practical requirements. Each isolated heat dissipation space has an independent fan and an independent air-inlet. Cooperating with the adjustment of the opening directions of the air-inlet and air-outlet and the design of the retaining wall, the interference between the independent airflows is reduced and the backflow is avoided. On the other hand, for the main heat-generating devices such as the inverter module, the boost module, the inverter choke and the boost choke in the photovoltaic inverter, it allows to arrange them in at least two heat dissipation spaces divided from the rear chamber according to the heat dissipation requirements. The independent airflow in each heat-dissipation space is used to dissipate the heat, so that the occurrence of hot air dissipation or hot air backflow is avoided, the overall efficiency of heat-dissipation effectively is improved effectively, and the optimization of heat dissipation performance is achieved. Certainly, the arrangement of the heat-generating devices is not limited to the illustrated embodiments, and not redundantly described hereafter.

In summary, the present disclosure provides a photovoltaic-inverter heat-dissipation assembly. By assembling the front housing-base with the rear cover, the internal space of the rear chamber is divided into at least two heat-dissipation spaces, which are capable of dissipating the heat source through the independent airflow, respectively, so as to provide the better heat-dissipation performance, avoid the generation of hot air backflow from affecting the overall heat-dissipation performance. Each of the at least two heat-dissipation space has an independent fan and an independent air-inlet correspondingly disposed therein, so that at least two independent airflows are formed to effectively dissipate at least two heat-generating devices, respectively. The airflows for heat-dissipating in the at least two heat-dissipation space do not interfere with each other. After completing the heat-dissipation actions, the at least two independent airflows are discharged through at least one air-outlet on the top side, respectively, so as to exert a good heat-dissipation effect effectively. The space of the rear chamber is divided into at least two heat-dissipation spaces, which are isolated from each other, and include an independent fan and an independent air-inlet, respectively. The openings of the air-inlets of the at least two heat-dissipation spaces face different directions, so that the mutual interference is reduced and the stability of the independent airflow flowing through the corresponding air-inlet is maintained. In addition, the flow directions of the independent airflows at the air-outlets are also different from the flow directions of the independent airflows at the corresponding air-inlets. Cooperating with the retaining wall arranged between at least one air-outlet and each air-inlet, the interference of the airflow is reduced, and the generation of heat-dissipation air backflow is avoided at the same time, so as to achieve the optimization of each independent airflow. On the other hand, since the retaining wall is arranged between at least one air-outlet and the air-inlets, when the photovoltaic-inverter heat-dissipation assembly is fixed to a wall through the retaining wall and maintains a spaced distance, a sufficient space between the back panel and the wall is provided for air flow. Moreover, the retaining wall structure is located between the air-outlet and the air-inlet, and it facilitates to prevent the airflow flowing through the upper air-outlet from flowing back to the lower air-inlet. It allows to arrange the active components such as the boost module, the inverter module, IGBT, MOSFETF semiconductor switching devices or the passive components such as the capacitors, the boost choke, the inverter choke and the resistors of the PV inverter in the at least two heat-dissipation spaces according to the actual heat-dissipation requirements, so as to exert the best heat-dissipation performance. The active components or the passive components with the requirements of waterproof and dustproof are accommodated in the front chamber and thermally coupled to the heat sink in the rear chamber, so as to dissipate the heat through the airflow. The active components or the passive components without the requirements of waterproof and dustproof are accommodated in the rear chamber to dissipate the heat through the airflow. In other words, the at least two heat-dissipation spaces divided from the rear chamber are configured to accommodate different sets of heat sinks or chokes, and the independent airflow in each heat-dissipation space is used to dissipate the heat, so that the occurrence of hot air dissipation or hot air backflow is avoided, and the overall efficiency of heat-dissipation effectively is improved effectively.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A photovoltaic-inverter heat-dissipation assembly comprising:
  a front housing-base comprising a rear mounting surface and at least one partition element, wherein the at least one partition element is disposed on the rear mounting surface;
  a rear cover combined with the at least one partition element and the rear mounting surface of the front housing-base to form a first heat-dissipation space, a second heat-dissipation space and a third heat-dissipation space, and comprising a first air-inlet, a second air-inlet and at least one air-outlet, wherein the first heat-dissipation space is separated from the second heat-dissipation space and the third heat-dissipation space, the first air-inlet is in communication with the at least one air-outlet through the first heat-dissipation space, and the second air-inlet is in communication with the at least one air-outlet through the second heat-dissipation space and the third heat-dissipation space;
  a first heat-generating device disposed on the rear mounting surface, and accommodated in the first heat-dissipation space;
  a first fan disposed adjacent to the first air-inlet, located between the first air-inlet and the first heat-generating device, and configured to generate a first airflow, which enters through the first air-inlet, flows through the first heating-generating device, and flows out through the at least one air-outlet;
  a second heat-generating device disposed on the rear mounting surface, and accommodated in the second heat-dissipation space; and
  a second fan disposed adjacent to the second air-inlet, located between the second air-inlet and the second heat-generating device, and configured to generate a second airflow, which enters through the second air-inlet, flows through the second heat-generating device, and flows out through the at least one air-outlet.

2. The photovoltaic-inverter heat-dissipation assembly according to claim 1, wherein the rear cover comprises a backbone spatially corresponding to a wall plane, and the photovoltaic-inverter heat-dissipation assembly is hung on the wall plane through the backbone.

3. The photovoltaic-inverter heat-dissipation assembly according to claim 2, wherein the rear cover comprises a retaining wall arranged outside the backbone, extended laterally, and configured to connect to the wall plane in a direction from the backbone toward the wall plane.

4. The photovoltaic-inverter heat-dissipation assembly according to claim 3, wherein the at least one air-outlet is arranged on the backbone and disposed adjacent to a top plane of the rear cover, wherein the first air-inlet is arranged on the backbone.

5. The photovoltaic-inverter heat-dissipation assembly according to claim 4, wherein the second air-inlet is disposed on a bottom plane of the rear cover.

6. The photovoltaic-inverter heat-dissipation assembly according to claim 3, wherein the backbone and the wall plane are arranged parallel to each other, and connected to each other through the retaining wall, and a spaced distance is maintained between the backbone and the wall plane.

7. The photovoltaic-inverter heat-dissipation assembly according to claim 1, wherein the at least one air-outlet comprises a first air-outlet and a second air-outlet spatially corresponding to the first heat-dissipation space and the second heat-dissipation space, respectively, and disposed adjacent to a top plane of the rear cover.

8. The photovoltaic-inverter heat-dissipation assembly according to claim 7, wherein the rear cover further comprises an auxiliary air-outlet arranged on a lateral plane of the rear cover and disposed adjacent to the top plane of the rear cover.

9. The photovoltaic-inverter heat-dissipation assembly according to claim 8, wherein the first fan is detachably disposed on the rear cover through an opening on the lateral plane, and located between the first air-inlet and the first heat-dissipation space.

10. The photovoltaic-inverter heat-dissipation assembly according to claim 7, further comprising a third heat-generating device and a third fan, wherein the first air-inlet is arranged between the first heat-dissipation space and the third heat-dissipation space, the first air-inlet and the third heat-dissipation space are isolated from each other, the rear cover further comprises a third air-inlet, and the at least one air-outlet further comprises a third air-outlet, wherein the third heat-generating device is disposed on the rear mounting surface and accommodated in the third heat-dissipation space, and the third fan is disposed adjacent to the third air-inlet, located between the third air-inlet and the third heat-generating device, and configured to generate a third airflow, which enters through the third air-inlet, flows through the third heat-generating device, and flows out through the third air-outlet.

11. The photovoltaic-inverter heat-dissipation assembly according to claim 10, wherein the third air-inlet is disposed on a bottom plane of the rear cover, and separated from the second air-inlet, and the third heat-dissipation space is located between the third air-outlet and the second heat-dissipation space.

12. The photovoltaic-inverter heat-dissipation assembly according to claim 10, wherein the front housing-base further comprises a front chamber, the rear mounting surface is located between the front chamber and the at least one partition element, the first heat-generating device comprises a first heat sink, and the first heat sink is thermally coupled to an inverter module accommodated in the first chamber through the rear mounting surface, wherein the second heat-generating device comprises an inverter choke, the third heat-generating device comprises a second heat sink and a boost choke, and the second heat sink is thermally coupled to a booster module accommodated in the first chamber through the rear mounting surface.

13. The photovoltaic-inverter heat-dissipation assembly according to claim 1, wherein an opening direction of the first air-inlet and an opening direction of the second air-inlet are different from each other.

14. The photovoltaic-inverter heat-dissipation assembly according to claim 1, wherein the first airflow and the second airflow have a flow direction at the at least one air-outlet different from a flow direction of the first airflow at the first air-inlet, and different from a flow direction of the second airflow at the second air-inlet.

15. The photovoltaic-inverter heat-dissipation assembly according to claim 1, wherein the front housing-base further comprises a front chamber, the rear mounting surface is located between the front chamber and the at least one partition element, the first heat-generating device and the second heat-generating device comprise a heat sink and a choke device, respectively, the heat sink is thermally coupled to an active component or a passive component accommodated in the first chamber through the rear mounting surface, and the choke device is a boost choke or an inverter choke.

\* \* \* \* \*